United States Patent [19]

Hilfiker

[11] Patent Number: 4,616,959
[45] Date of Patent: Oct. 14, 1986

[54] SEAWALL USING EARTH REINFORCING MATS

[75] Inventor: William K. Hilfiker, Eureka, Calif.

[73] Assignee: Hilfiker Pipe Co., Eureka, Calif.

[21] Appl. No.: 715,929

[22] Filed: Mar. 25, 1985

[51] Int. Cl.[4] .................... E02D 5/00; E02D 29/02
[52] U.S. Cl. .................................. 405/286; 405/284
[58] Field of Search .............. 405/262, 258, 272, 275, 405/284–286; 403/209, 381; 160/395

[56] References Cited

U.S. PATENT DOCUMENTS

| | | | |
|---|---|---|---|
| 1,055,489 | 3/1913 | Pendery | 160/395 X |
| 3,686,873 | 8/1972 | Vidal . | |
| 3,925,994 | 12/1975 | Broms et al. . | |
| 4,068,482 | 1/1978 | Hilfiker . | |
| 4,273,476 | 6/1981 | Kotulla et al. | 405/284 X |
| 4,324,508 | 4/1982 | Hilfiker et al. | 405/284 |
| 4,343,571 | 8/1982 | Price | 405/284 |
| 4,391,557 | 7/1983 | Hilfiker et al. | 405/284 X |
| 4,470,728 | 9/1984 | Broadbent | 405/284 |
| 4,514,113 | 4/1985 | Neumann | 405/284 X |

FOREIGN PATENT DOCUMENTS 0000221  1/1982  Japan ................................. 405/284

Primary Examiner—Cornelius J. Husar
Assistant Examiner—Nancy J. Stodola
Attorney, Agent, or Firm—Limbach, Limbach & Sutton

[57] ABSTRACT

A seawall is provided by embedding perforate polymer mats within an earthen formation and securing the mats to stacked preformed concrete panels at the face of the formation. The mats are wrapped around rods and secured to the panels by capturing the rods between opposed surfaces on the panels. Seals and filter closures are disposed between the panels to shield the formation from sloughing and the intrusion of water.

7 Claims, 3 Drawing Figures

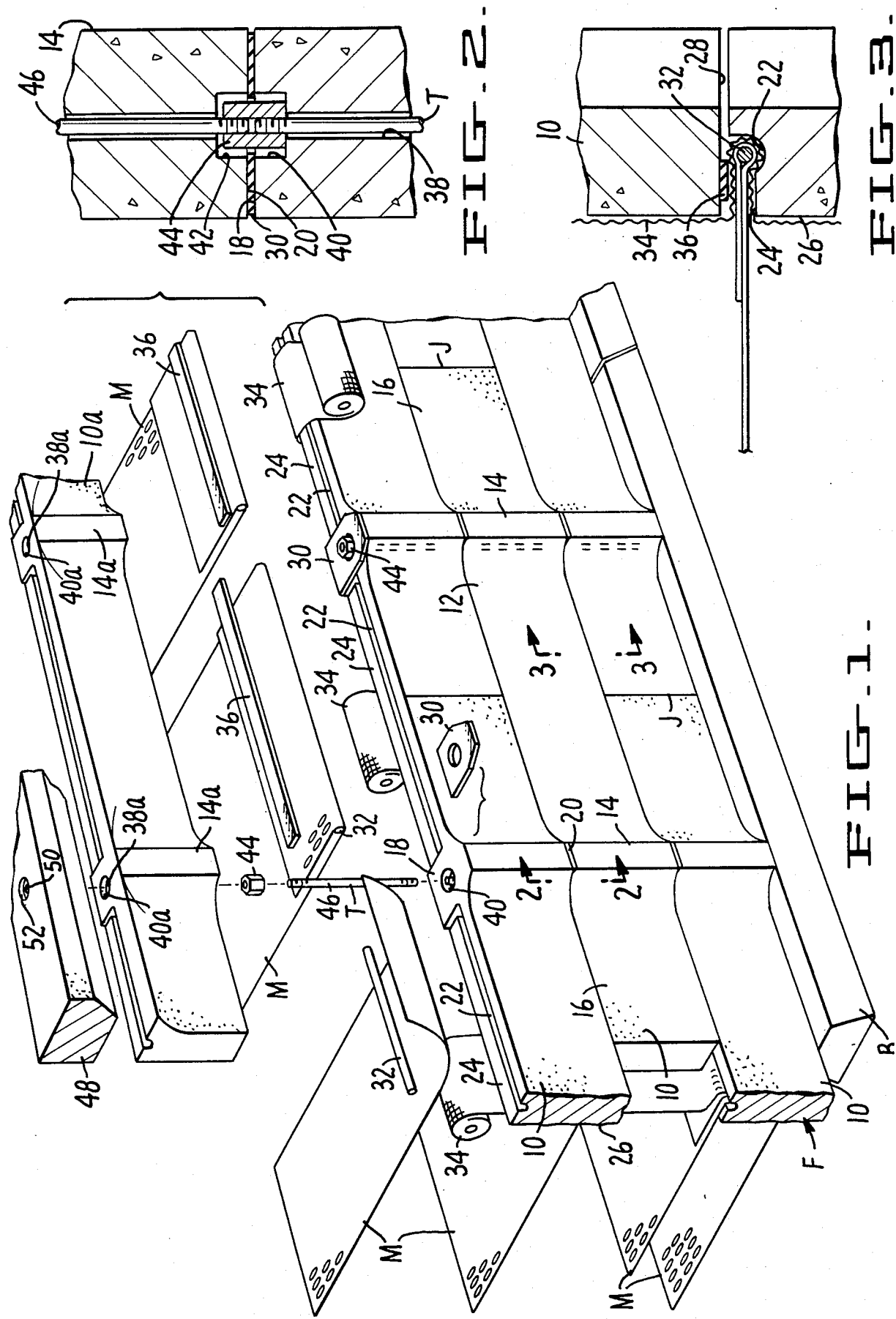

SEAWALL USING EARTH REINFORCING MATS

BACKGROUND OF THE INVENTION

The present invention relates to a seawall wherein the strength of the wall is achieved through means of earth reinforcement and face panels are provided to prevent sloughing and shield the wall from water intrusion. In its more specific aspects, the invention is concerned with such a wall wherein the earth reinforcing elements comprise perforate polymer sheets, the face panels comprise precast concrete members, and the reinforcing elements are secured to the panels through means of corrosion proof structure.

The prior art teaches providing soil reinforced walls with concrete face panels. One such wall may be seen in U.S. Pat. No. 4,324,508, coinvented by the inventor herein, wherein reinforcement is provided by welded wire mats and preformed concrete panels are connected to the mats by various techniques, all of which include metal connectors. Other such walls may be seen in the following third-party U.S. Pat. Nos.: 3,686,873; 3,925,994; and 4,470,728. These third-party patents are of particular interest in that they teach the use of such walls with reinforcing elements which comprise woven synthetic fabrics, or monolithic plastic sheets. U.S. Pat. Nos. 3,925,994 and 4,470,728 teach the concept of clamping such elements between the face panels.

Another patent of interest by the inventor herein is U.S. Pat. No. 4,068,482. Although that patent is not concerned with a wall wherein reinforcing elements are secured to face panels, it is of interest in that it suggests securing the face panels of an anchor wall together through means of tie rods.

SUMMARY OF THE INVENTION

In its broadest aspects the present invention is concerned with an improved seawall construction wherein concrete face panels are secured in stacked aligned relationship and perforate polymer reinforcing mats are secured between the panels through means of a secure connection which does not rely upon metallic components for its integrity. The connection is provided by forming the face panels with apposed complemental surfaces, at least one of which includes a longitudinally extending groove adapted to capture an anchor member carried by the reinforcing mat. The anchor member simply comprises a rod about which the end of the mat is wrapped. A stepped recess accommodates placement of the mat in a condition wherein the rod may be captured by the groove. Seals are provided between the stacked face panels to prevent sloughing and water intrusion. End joints between the panels are covered with filter fabric which serves to essentially prevent sloughing or water intrusion therethrough.

In the preferred embodiment, the panels are secured in stacked aligned relationship by tie rods extending through stacking columns thereon. Pads on the stacking columns maintain the panels in slightly spaced relationship.

A principal object of the invention is to provide a seawall which incorporates the principles of earth reinforcement for its principal load-carrying capacity and is provided with a concrete face to prevent sloughing and water intrusion.

Another object of the invention is to provide such a wall wherein the earth reinforcing elements are secured to the face through corrosion proof connections.

Still another object of the invention is to provide such a wall wherein the reinforcing elements comprise perforate polymer sheets and connectors are provided for securing such sheets in concrete face panels in such a way as to minimize stretching or creep of the sheets, or slippage of the connection.

A further object of the invention is to provide such a wall wherein seal and closure means are provided to minimize sloughage and water intrusion through the joints between the face panels.

Still another object of the invention is to provide such a wall wherein the face panels are secured in stacked relationship through means of tie rods and stacking pads maintain the stacked panels in slightly spaced relationship.

These and other objects will become more apparent when viewed in light of the following detailed description and accompanying drawings.

BRIEF DESCRIPTION OF THE DRAWINGS

FIG. 1 is an exploded perspective view of the wall of the present invention, illustrating the uppermost course of the wall in the process of placement;

FIG. 2 is a cross-sectional view taken on the plane designated by line 2—2 of FIG. 1; and FIG. 3 is a cross-sectional view taken on the plane designated by line 3—3 of FIG. 1.

DESCRIPTION OF THE PREFERRED EMBODIMENT

Referring now to FIG. 1, the wall is shown as comprising precast concrete elements including a base or levelling course "B" having a plurality of face panel courses "F" stacked thereabove. Each of these courses is made up of precast reinforced concrete members. The base course members are of generally truncated triangular cross-section. The members of the face panel courses comprise face panels 10 disposed in end-to-end relationship, with the joints "J" between the ends of the panels and successive courses staggered relative to one another, in "brick" fashion. Each face panel comprises an elongated central section 12, a stacking column 14 at either end of the central section, and an end section 16 to the outside of each stacking column. Stacking columns 14 extend vertically over the full height of the face panels and are provided with planar top and bottom surfaces 18 and 20, respectively. The tops of the central and end sections of each face panel are formed with longitudinally extending grooves 22 and a step 24 to the rear of the grooves which extends from the grooves to the back surface of the panels, designated 26. The tops of the central and end sections forward of the groove 22 are coplanar with the top surfaces 18 of the columns 14. The bottom surface 28 of each of the face panels 10 is planar and complemental to the top of the panel therebeneath (see FIG. 3).

Stacking pads 30 of a neoprene or composition material are disposed on the columns 16 between the successive courses so as to slightly space the courses from one another (see FIG. 2). Although not illustrated, it should be understood that such pads are provided between the base course "B" and the stacking columns of the first course of face panels thereabove.

The soil reinforcing mats, designated "M", are fabricated of a creep resistant perforate polymer material.

The material may be of either the monolithic geogrid type, or the fabric geotextile type. For example, geogrid mats of "Tensar" SR-2 available through the Tensar Corporation of Seattle, Wash., or geotextile mats having the following specifications:

a. Wide strip tensile strength in the direction which the fabric will be loaded when installed in the wall (i.e., perpendicular to the wall face) of 1000 pounds per inch.
b. Water permeability of 0.005 centimeters per second.
c. Fabric filaments in the direction in which the mats will be loaded (i.e., perpendicular to the wall face) of polyester.

Such mats are provided between the successive courses of the wall, with the mats secured between the apposed central and end sections of the successive courses.

The mats are secured in place between the panels by wrapping the distal end portions of the mats around polymer rods 32 so that the mat is folded upon itself, as shown in FIG. 3, with the rod at the distal end of the mat received within the groove 22. Prior to so positioning the rod within the groove, a filter fabric closure strip 34 is extended over the back of the wall in apposition to the joints "J". The strips, as may be seen from FIG. 3, are positioned so as to wrap around the distal end portion of the mats prior to engagement of said portions within the grooves 22. Thus, the mats "M" and rods 32 function to secure the strips in place against the back of the face panels. A sealing strip 36 is positioned above each mat and in apposition to the step 24, as may be seen in FIG. 3, to seal the horizontal joint between the successive courses of face panels against sloughing or water intrusion. The sealing strip is ideally some type of elastomeric material, such as butyl rubber.

In the assembled wall, tie rods "T" extend vertically through passages 38 provided therefor in the stacking columns 14. Enlarged recesses 40 and 42 are formed in the top and bottom surfaces, respectively, of the stacking columns in communication with the passages 38. These recesses accommodate coupling nuts 44 for the tie rods "T". Each tie rod comprises a plurality of short sections 46, with the upper and lower ends thereof threaded into coupling nuts 44. Although not illustrated, it should be understood that one such nut would be received between the base levelling course "B" and the lowermost face course "F". In the assembled condition, the coupling nuts 44 serve to secure each course of face panels "F" to the course therebeneath, as is evident from FIG. 2. Ideally, the coupling nuts 44 and tie rod sections 46 are made of a non-corrodible material, such as nylon.

The proportions of the wall components may vary, depending upon the environment in which the wall is to be erected. For example, the face panels might typically have a length of about 12 feet, height of from 18 inches to 2 feet and depth of from 8 to 12 inches. The mats might typically measure 4 feet in width and have a length dictated both by the type of soil being reinforced and the size of the excavation for the wall. Calculations for designing the mat sizes and the proportions of the various components are well within the skill of the art.

As shown in FIG. 1, the topmost panel, designated 10a, is of a modified construction as compared to the panels 10 in that it has a broadened forwardly flared top portion for support of a cap panel 48. The panels 10a and 48 are fabricated of reinforced concrete. Stacking columns 14a, similar to the columns 14 of the panels 10, are formed in the panel 10a and have passages 38a extending vertically therethrough for receipt of tie rods. The upper ends of the passages 38a are formed with enlarged recesses 40a for receipt of coupling nuts. The cap panels 48 are provided with similar passages and recesses 50 and 52, respectively.

In erecting the retaining wall, the earthen formation is first excavated to prepare the situs for the wall. Then the base course "B" is placed and levelled and successive courses of the wall are erected thereabove. As each course is placed, the mat "M" therefor is covered with backfill and compacted and the mat of the next successive course is placed thereabove. During the course of placement of the mats, the distal forward portions of the mats are secured through means of the rods 32 and the filter fabric closure strips are placed over the vertical joints so as to run continuously from the top to the bottom of the wall. As each successive course is placed with the mats therefor, the tie rod sections 46 are threaded through the passages 38 and secured to the top and bottom of each panel through means of the coupling nuts 44. The steps of successively placing each course and the mat therefor are repeated until the wall reaches the desired composite height, at which point the final face panel 10a is positioned and mats "M" are secured between that panel and the cap panel 48. The cap panel 48 is secured to the panel 10a through means of tie rod sections and coupling nuts similar to the sections 46 and nuts 44, with the exception that the sections are of a lesser length to accommodate the lesser depth of the panel 48. The final step in completing the wall is typically to grout over the recess 52 in the panel 48.

CONCLUSION

From the foregoing detailed description it is believed that the present invention enables the attainment of the objects initially set forth herein. It should be understood, however, that the invention is not intended to be limited to the specifics of the illustrated embodiment. For example, while the illustrated embodiment employs monolithic mats of the geogrid type, fabric geotextile mats of the type described may be used.

I claim:

1. A wall for retaining and protecting the face of an earthen formation, said wall comprising: paired face panels stacked upon one another at the face of the formation, said paired panels having back surfaces in apposition to the formation, mutually engageable stacking columns at spaced locations along the length thereof, and surfaces opposed to one another intermediate said columns; a longitudinally extending groove formed in the opposed surface of at least one of said paired panels in spaced relationship to the back surface thereof; a recessed step formed in the opposed surface of at least one of said paired panels, said step being uninterrupted and co-extensive with said groove, said step extending to the back surface of the panel within which it is formed and communicating with and having a depth less than the groove; a soil reinforcing mat embedded within the formation, said mat having a distal portion extending over the recessed step and secured to an enlarged anchor captured between said groove and the opposed surface of the panel in opposition thereto; and seal means within the step engaged with the mat to restrict the intrusion of water through the wall and into the formation.

2. A wall according to claim 1 further comprising pads on the mutually engaged stacking columns to maintain the opposed surfaces of the face panels in spaced relationship.

3. A wall according to claim 2 further comprising tie means extending through the stacking columns to secure the panels against separation from one another.

4. A wall according to claim 1 wherein the mat comprises a perforate polymer sheet and the enlarged anchor comprises a rod received within the groove and a section of the sheet wrapped around the rod.

5. A wall according to claim 4 wherein the sheet is folded upon itself within the step after wrapping around the rod.

6. A wall according to claim 1 comprising a plurality of said paired panels wherein at least certain of said panels are disposed in end-to-end relationship, said wall further comprising means covering the ends of the panels disposed in end-to-end relationship to restrict the passage of material therebetween.

7. A wall according to claim 6 wherein the covering means comprises filter fabric disposed between the face panels and the formation at the ends of the panels disposed in end-to-end relationship, said fabric extending between the opposed surfaces of the paired panels and around the enlarged anchors captured therebetween.

* * * * *